United States Patent
Schilling-Benz et al.

(10) Patent No.: US 7,139,115 B2
(45) Date of Patent: Nov. 21, 2006

(54) ATHERMALIZATION OF AN OPTICAL PARAMETRIC OSCILLATOR

(75) Inventors: Lynn Schilling-Benz, Fairport, NY (US); Jinmei Zhang, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 47 days.

(21) Appl. No.: 10/838,666

(22) Filed: May 4, 2004

(65) Prior Publication Data

US 2005/0248831 A1    Nov. 10, 2005

(51) Int. Cl.
    *G02F 1/39*    (2006.01)
(52) U.S. Cl. ..................... 359/330; 359/326
(58) Field of Classification Search ............ 372/21–22; 359/330
    See application file for complete search history.

(56) References Cited

U.S. PATENT DOCUMENTS

| | | | |
|---|---|---|---|
| 3,528,206 A | 9/1970 | Baird | 52/1 |
| 3,610,945 A * | 10/1971 | Boyd et al. | 359/330 |
| 4,019,159 A | 4/1977 | Hon et al. | 359/278 |
| 4,864,098 A | 9/1989 | Basanese et al. | 219/121.61 |
| 4,884,276 A | 11/1989 | Dixon et al. | 372/21 |
| 5,017,806 A | 5/1991 | Edelstein et al. | 359/330 |
| 5,117,126 A * | 5/1992 | Geiger | 359/330 |
| 5,144,629 A | 9/1992 | Basu | 372/20 |
| 5,159,487 A * | 10/1992 | Geiger et al. | 359/330 |
| 5,191,587 A | 3/1993 | Hanson et al. | 372/21 |
| 5,243,611 A | 9/1993 | Hyuga et al. | 372/22 |
| 5,325,229 A | 6/1994 | Millard | 359/330 |
| 5,328,575 A | 7/1994 | Geiger | 204/157.15 |
| 5,377,043 A | 12/1994 | Pelouch et al. | 359/326 |
| 5,390,211 A | 2/1995 | Clark et al. | 372/95 |
| 5,521,390 A | 5/1996 | Sato et al. | 250/442.11 |
| 5,606,453 A | 2/1997 | Walling et al. | 359/330 |
| 5,680,412 A | 10/1997 | DeMaria et al. | 372/92 |
| 5,737,346 A | 4/1998 | Stenstrom | 372/21 |
| 5,796,477 A * | 8/1998 | Teich et al. | 356/318 |
| 5,854,802 A | 12/1998 | Jin et al. | 372/22 |

(Continued)

FOREIGN PATENT DOCUMENTS

DE    19819473    11/1999

(Continued)

OTHER PUBLICATIONS

B. Ruffing, A. Nebel and R. Wallenstein, All-solid-state cw mode-locked picosecond $KTiOAsO_4$ (KTA) optical parametric oscillator, Applied Physics B. Lasers and Optics, Springer-Verlag 1998; B 67, pp. 537-544. Universitat Kaiserslautern, Kaiserslautern, Germany.

Primary Examiner—John D. Lee
(74) Attorney, Agent, or Firm—Clyde E. Bailey, Sr.; Paul A. Leipold

(57) ABSTRACT

A method for thermally stabilizing an optical parametric oscillator (OPO) 10 to maintain constant optical path length for stable high power output places a beam dump 32 outside an OPO cavity 18. The OPO 10 has a nonlinear crystal 22 within cavity 18 for splitting a single input pump beam 14 into lower energy signal and idler beams 16, 18. The method includes providing a cavity exit port for unconverted pump and generated idler beams, and absorbing unconverted beams in beam dump 32. The method includes athermalization by actively cooling surfaces used as an optics mounting base, and athermalization by constraining the size of cavity 18 by using thermally stiff members, guiding pins or rails, or by using bimetallic materials with different expansion.

14 Claims, 1 Drawing Sheet

U.S. PATENT DOCUMENTS

| | | | |
|---|---|---|---|
| 5,982,789 A | 11/1999 | Marshall et al. | 372/22 |
| 5,999,547 A | 12/1999 | Schneider et al. | 372/21 |
| 6,002,696 A | 12/1999 | Ohishi et al. | 372/22 |
| 6,330,256 B1 | 12/2001 | Byren et al. | 372/21 |
| 6,433,918 B1 | 8/2002 | Kasai et al. | 359/330 |
| 6,456,424 B1 | 9/2002 | Arbore et al. | 359/330 |
| 6,497,490 B1 * | 12/2002 | Miller et al. | 359/614 |
| 6,768,576 B1 * | 7/2004 | Caudle | 359/326 |

FOREIGN PATENT DOCUMENTS

| | | |
|---|---|---|
| EP | 0 278 201 | 8/1988 |
| EP | 0 659 548 | 6/1995 |
| GB | 1 451 597 | 10/1976 |

* cited by examiner

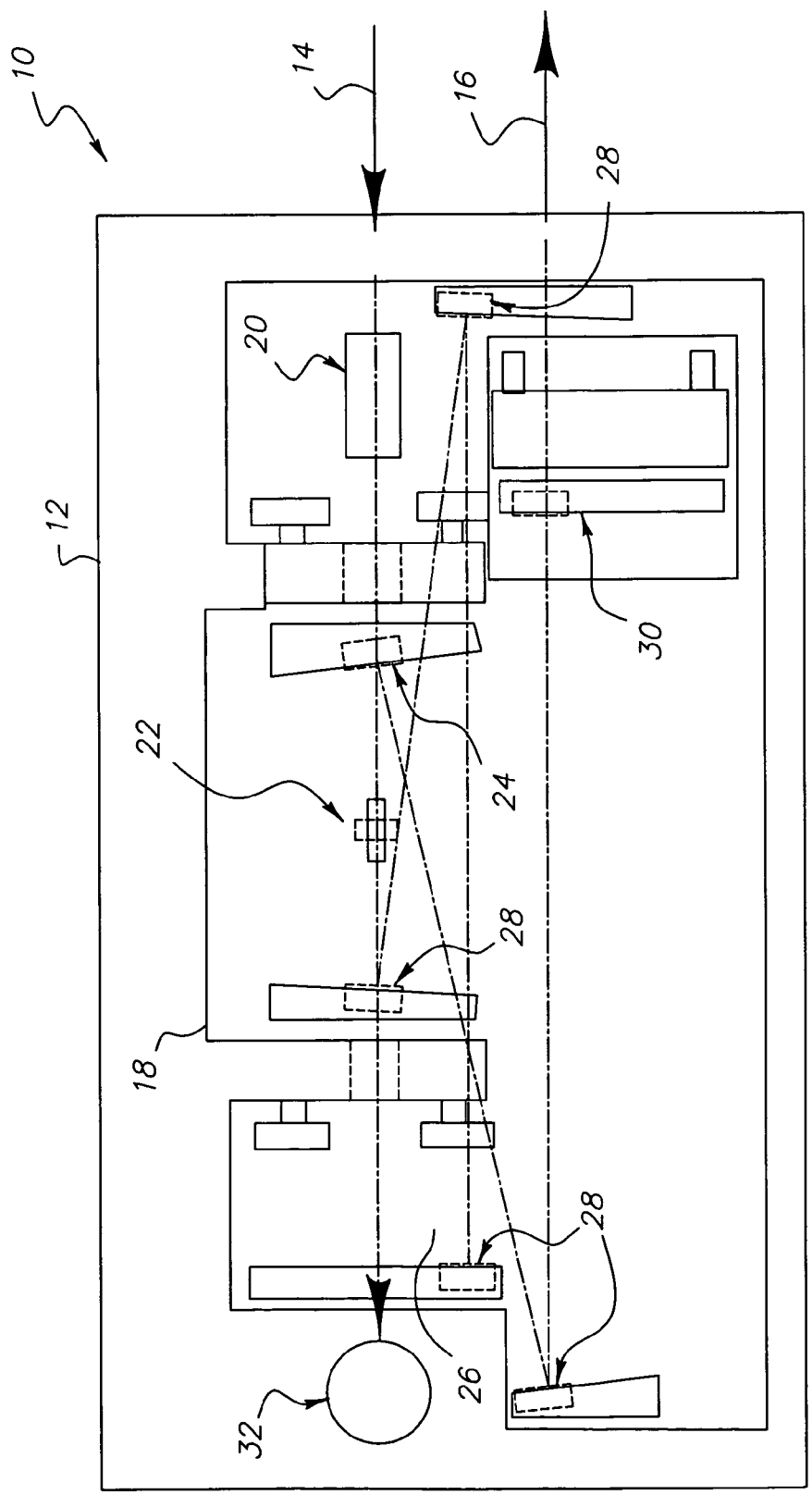

ATHERMALIZATION OF AN OPTICAL PARAMETRIC OSCILLATOR

FIELD OF THE INVENTION

The invention relates generally to an optical parametric oscillator, and, more particularly, to thermally stabilizing an optical parametric oscillator to maintain constant optical path length for peak power output.

BACKGROUND OF THE INVENTION

The power output of an optical parametric oscillator (OPO) is predicted to be path length dependent. Experimental data for a particular OPO configuration show that path lengths must be maintained to within +/−50 micrometers of the peak position to maintain a power level of 95% of the peak power. To stay within 95% of the relatively stable portion of the power curve, slightly below peak power, path length changes of approximately +/−150 micrometers can be tolerated. The power output of another OPO configuration is even more path length dependent requiring path length changes of only +/−10 micrometers to maintain power levels to within 95% of the peak power. To stay within 95% of the relatively stable portion of the power curve, path length changes of approximately only +/−35 micrometers can be tolerated.

The path length of an OPO can be very dependent on thermal conditions, so athermalization is necessary. In one OPO, the unused pump energy of the IR pump source, as well as the idler energy is absorbed in a beam dump, contained within the OPO cavity. The beam dump is cooled using a closed loop chiller system, in which the chiller water first passes through the bulk of the OPO cavity (in channels running through the base plate), and is then in direct contact with the beam dump. After contacting the beam dump, the coolant returns to the chiller. Because of thermal loading, the chiller temperature is found to increase by approximately 2° C. over an 8-hour period. The coolant never reaches an equilibrium temperature, although the temperature rise slows with time. The output power reaches 95% of the final value within 1.5 hours of start up.

Thermal modeling of the OPO indicates that path lengths are strongly affected by thermal loading and the cooling configurations. Coolant temperature has a strong influence on the optical path length in the OPO, with a 2° C. rise in coolant temperature resulting in an approximately 75 micron path length change. Coolant temperature is determined by the chiller set point and by thermal loading due to the OPO internal heat sink. Ambient air temperature has only a very slight effect on the path length, with temperature rises of approximately 5° C. resulting in only a 2 micrometer increase in path length.

The path length of an OPO can be very dependent on thermal conditions. Thermal modeling of the OPO indicates that path lengths are strongly affected by thermal loading and the cooling configurations. Coolant temperature has a strong influence on the optical path length in the OPO, with a 2° C. rise in coolant temperature resulting in an approximately 75 micron path length change. The strong dependence of path length on coolant temperature and thermal loading result in a system that is not robust in terms of output power. In addition, long warm up times are required so that coolant temperature comes close to equilibrium. It will be appreciated that it would be highly desirable to have a method for controlling temperature to achieve a optical parametric oscillator that is robust in terms of power output.

SUMMARY OF THE INVENTION

The present invention is directed to overcoming one or more of the problems set forth above. Briefly summarized, according to one aspect of the invention, a method for thermally stabilizing an optical parametric oscillator (OPO) to maintain constant optical path length for peak power output comprises placing a beam dump outside an (OPO) cavity. The optical parametric oscillator has a nonlinear crystal for splitting a single input pump beam into lower energy signal and idler beams. The crystal is located within the cavity to provide feedback for one or more wavelengths, with unconverted pump and the generated idler beams dumped into the beam dump. The method includes providing an exit port in the cavity for the unconverted pump and generated idler beams, and absorbing the unconverted pump and generated idler beams in the beam dump.

The beam dump is a heat sink which absorbs heat from the unused beams. Locating the beam dump outside the OPO cavity removes a source of heat from the cavity which would change the path length the beam traverses thereby affecting output power. Actively cooling the beam dump allows temperature to be controlled. The OPO cavity can also be actively cooled from the same coolant source or from a different coolant source. In the event that the cavity is cooled using the same coolant source, care must be taken to have a large enough volume of coolant to avoid any significant temperature increase of the coolant. It is preferable to cool the OPO cavity and the beam dump independently.

Another aspect of the invention is constraining the cavity length by using one of a variety of techniques, including simultaneously using metals with expansion coefficients of opposite sign to cancel length changes of surfaces to which optics are mounted, using guiding pins between cooled surfaces and uncooled surfaces, using thermally stiff members to constrain surfaces and the like.

BRIEF DESCRIPTION OF THE DRAWINGS

The above and other objects, features, and advantages of the present invention will become more apparent when taken in conjunction with the following description and drawing wherein the drawing is a diagram of an optical parametric oscillator.

To facilitate understanding, identical reference numerals have been used, where possible, to designate identical elements that are common to the figures.

DETAILED DESCRIPTION OF THE INVENTION

Referring to the drawing, an optical parametric oscillator 10 (OPO) is contained within a shielding structure 12. A pump beam 14 enters the shielding structure and a signal beam 16 emerges from the shielding structure. A cavity 18 exists within the shielding structure 12. The input beam 14 is conditioned and focused by focusing mirror 24 into a nonlinear crystal 22 by beam conditioning optics 20. Input beam is 14 split into the signal or output beam 16 and idler beam 26 by the nonlinear crystal 22. Signal beam 16 and idler beam 26 are refracted and directed by a number of mirrors 28. Signal beam 16 emanates from an output coupler 30 while idler beam 26 is sent to a beam dump 32.

As stated, the strong dependence of beam path length on coolant temperature and thermal loading result in a system that is not robust in terms of output power. To solve this problem, the present invention locates the beam dump outside the OPO cavity thereby removing a source of heat from the cavity which would change the path length the beam traverses thereby affecting output power.

Stabilization of the OPO cavity is achieved by removing the primary heat source. The beam dump is removed from the OPO cavity and placed outside the cavity. This can be achieved by having an exit port in the cavity enclosure for the pump and/or idler beams. Both, the pump and idler beams are absorbed by a beam dump. The beam dump design is such that heat can not be transferred back to the OPO cavity. The beam dump should be actively cooled. If the OPO cavity is cooled as well, care should be taken that the coolant volume is sufficiently large that no appreciable rise in coolant temperature occurs. Another option is to cool the OPO cavity with a separate coolant.

Athermalization of the OPO cavity can be achieved by mounting optical elements to cavity surfaces that are actively cooled. Some possible scenarios include coolant channels in base of OPO cavity to allow chilled water to remove heat, or coolant channels in sidewalls of the cavity, and optical elements only mounted to those surfaces actively cooled.

Because sidewalls show the most deformation, constraining movement of sidewalls is another scenario. This can be achieved by using guiding pins between cover, base and sidewalls, or if base and sidewalls are a single piece of material, only between sides and cover. It may be necessary to athermalize the constraining surface, i.e. if the top is used to constrain the sidewalls, it could be made out of material with a very low thermal expansion coefficient, it could be chilled or the like. Guide rails or channels in either or both surfaces in contact can be used in place of or in addition to guiding pins.

Athermalization of any surface that optics are mounted to can be done by selecting materials with low thermal expansion coefficients or constraining surfaces with thermally stiff members. Also, athermalization of cavity by means of use of bimetallic structure is effective. Path lengths are compensated by use of metals with differential expansion coefficients.

A method for thermally stabilizing an optical parametric oscillator to maintain constant optical path length for peak power output, comprises providing an exit port in the cavity for the unconverted pump and generated idler beams; locating the beam dump outside the cavity; and absorbing the unconverted pump and generated idler beams in the beam dump. Actively cooling the beam dump improves performance. Placing the optical parametric oscillator within an enclosure and cooling the enclosure are also steps that can be taken. Other steps are actively cooling cavity surfaces and mounting optical elements to cavity surfaces that are actively cooled. Athermalizing surface optics improves stability.

Constraining movement of sidewalls of the cavity and constraining surfaces with thermally stiff members helps stabilize path length. Selecting materials with low thermal expansion coefficients helps resist changes in path length due to thermal expansion. Athermalizing the cavity by using bimetallic materials with expansion coefficients of opposite sign allows compensation of different length changes. Essentially one metal wants to expand while the other wants to shrink, so with the appropriate choice of metals, the tendencies to change size are canceled.

It can now be appreciated that an optical parametric oscillator can be used to generate IR wavelengths from a single input beam. An optical parametric oscillator can be thought of as a "photon slicer", because a single pump photon (input beam) is split into two lower-energy photons within the nonlinear crystal. The two generated wavelengths are referred to as the signal and the idler beams, and the wavelengths are dictated by conservation of energy and momentum. To increase the conversion efficiency, the nonlinear crystal is placed within a cavity to provide feedback for one or more wavelengths. Upon exiting the nonlinear crystal, the unconverted pump and the generated idler are dumped into a heat sink.

Very short mode-locked pulses are used because the conversion efficiency is proportional to the peak power, however a complication arises due to the short mode-locked pulses. In order for the OPO to be efficient, it must be synchronously pumped, meaning that the resonant signal pulses must precisely overlap the incoming pump pulses. Very short pulse durations translate into extremely short pulse lengths in air. Typically pulses must coincide to within less than about half a mm for efficient conversion. To achieve this requirement, the OPO cavity length must match the oscillator cavity length (source of the pump beam). For this reason, a recirculating chiller is used to thermally stabilize the OPO cavity and avoid any thermally induced path length changes. The present invention places the beam dump outside the OPO cavity to further reduce any thermally induced path length changes. In addition, the cavity can be athermalized by actively cooling surfaces to which optics are mounted. This further reduces path length changes.

The invention has been described with reference to a preferred embodiment; However, it will be appreciated that variations and modifications can be effected by a person of ordinary skill in the art without departing from the scope of the invention.

PARTS LIST 10 optical parametric oscillator
12 shielding structure
14 pump beam
16 signal beam
18 cavity
20 beam conditioning optics
22 nonlinear crystal
24 focusing mirror
26 idler beam
28 mirrors
30 output coupler
32 beam dump

What is claimed is:

1. A method for thermally stabilizing an optical parametric oscillator to maintain constant optical path length for peak power output, said optical parametric oscillator having a nonlinear crystal for splitting a single input pump beam into lower energy signal and idler beams, said crystal being placed within a cavity to provide feedback for one or more wavelengths with unconverted pump and the generated idler beams dumped into a beam dump, said method comprising the steps of:
    providing an exit port in the cavity for the unconverted pump and generated idler beams;
    locating the beam dump outside the cavity; and
    absorbing the unconverted pump and generated idler beams in the beam dump including the steps of:
    actively cooling cavity surfaces,
    mounting optical elements to cavity surfaces that are actively cooled, and placing the optical parametric oscillator within an enclosure; and cooling the enclosure.

2. The method of claim 1, including actively cooling the beam dump.

3. The method of claim 1 including constraining movement of sidewalls of the cavity.

4. The method of claim 1 including athermalizing surfaces of said cavity that are adapted for mounting optical elements.

5. The method of claim 4 including selecting materials with low thermal expansion coefficients.

6. The method of claim 4 including constraining surfaces with thermally stiff members.

7. The method of claim 4 including athermalizing said cavity by using bimetallic materials with different expansion to compensate for different potential length changes.

8. A method for thermally stabilizing an optical parametric oscillator to maintain constant optical path length for peak power output, said optical parametric oscillator having a nonlinear crystal for splitting a single input pump beam into lower energy signal and idler beams, said crystal being placed within a cavity to provide feedback for one or more wavelengths with unconverted pump and the generated idler beams dumped into a beam dump, said method comprising the steps of:

providing an exit port in the cavity for the unconverted pump and generated idler beams;

locating the beam dump outside the cavity; and absorbing the unconverted pump and generated idler beams in the beam dump, athermalizing surfaces of said cavity that are adapted for mounting optical elements, and actively cooling the cavity surfaces.

9. The method of claim 8, including actively cooling the beam dump.

10. The method of claim 9 including the steps of:

placing the optical parametric oscillator within an enclosure; and cooling the enclosure.

11. The method of claim 8 including constraining movement of sidewalls of the cavity.

12. The method of claim 8 including selecting materials with low thermal expansion coefficients.

13. The method of claim 8 including constraining surfaces with thermally stiff members.

14. The method of claim 8 including athermalizing said cavity by using bimetallic materials with different expansion to compensate for different potential length changes.

* * * * *